July 8, 1924.
W. THURMAN ET AL
WINDSHIELD ATTACHMENT
Filed March 24, 1923
1,500,425
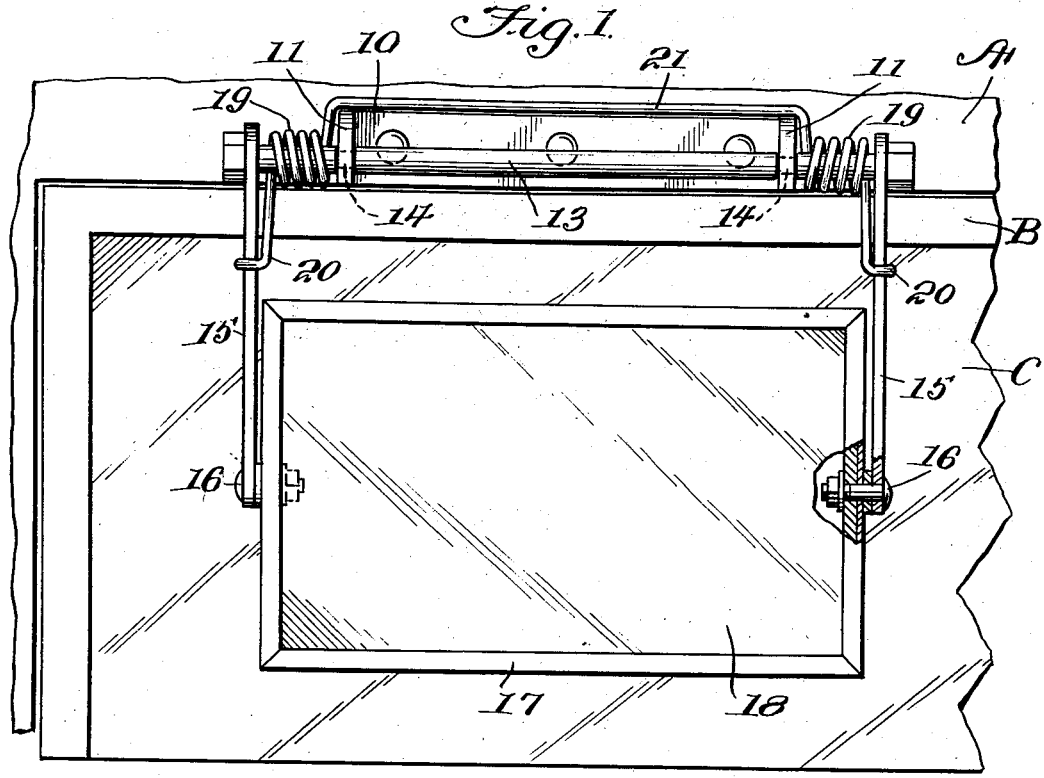
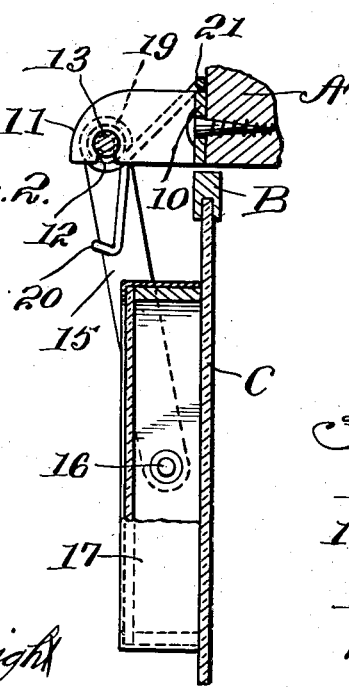
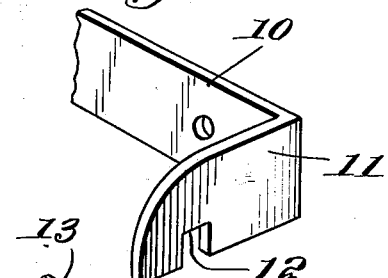
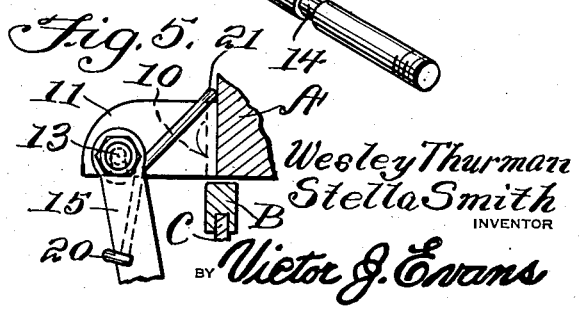
Wesley Thurman
Stella Smith
INVENTOR
BY Victor J. Evans
ATTORNEY
WITNESS:

Patented July 8, 1924.

1,500,425

UNITED STATES PATENT OFFICE.

WESLEY THURMAN AND STELLA SMITH, OF VIRGINIA, MINNESOTA.

WINDSHIELD ATTACHMENT.

Application filed March 24, 1923. Serial No. 627,384.

*To all whom it may concern:*

Be it known that we, WESLEY THURMAN and STELLA SMITH, citizens of the United States, residing at Virginia, in the county of St. Louis and State of Minnesota, have invented new and useful Improvements in Windshield Attachments, of which the following is a specification.

This invention relates to attachments or accessories for automobiles and has for its object the provision of a novel storm window designed to lie against the windshield for the purpose of preventing frosting thereof at any time, so that the driver may have a clear and unobstructed view at all times.

An important object is the provision of a device of this character which, lying snugly against the windshield provides a dead air space between the attachment and the windshield which will serve as an effective insulation and consequently prevent frosting.

Another object is the provision of an attachment of this character equipped with novel and peculiar means whereby it may be quickly mounted in position or removed whenever such is necessary.

An additional object is the provision of a device of this character which will be simple and inexpensive in manufacture, highly efficient in use, durable in service and a general improvement in the art.

With the above and other objects and advantages in view the invention consists in the details of construction to be hereinafter more fully described and claimed, and illustrated in the accompanying drawings, in which:

Figure 1 is an elevation of the device in applied position,

Figure 2 is a side view, the windshield being in section,

Figure 3 is a detail perspective view of one corner of the supporting bracket,

Figure 4 is a detail view of the supporting bar and

Figure 5 is a detail section through the car showing a fragmentary side elevation of the attachment.

Referring more particularly to the drawings the letter A designates a portion of the frame of a closed car of any kind, immediately above the frame of the windshield B. The windshield of course includes the usual glass pane C. In carrying out our invention we provide a supporting bracket 10 which is secured upon the frame A above the windshield and which in actual practice is simply an elongated strip of metal screwed or otherwise fastened in place and provided at its ends for forwardly extending ears or projections 11 which have their upper edges curved as shown and which have their lower edges formed with notches 12. In connection with this bracket we provide an elongated bar or rod 13 which is formed near its ends with grooves or notches 14 which fit within the notches 12 for preventing the bar from having longitudinal movement with respect to its supporting bracket.

Carried by this bar are depending arms 15 which have their ends pivotally connected at 16 with a rectangular frame 17 covered with glass indicated at 18. The frame 17 is disposed against the windshield as shown and provides a dead air space between the windshield and the glass of the attachment.

In order to hold this frame properly in place in snug engagement with the windshield, we provide a spring device which consists of a single length of wire coiled about the bar 13 between the ends thereof and the ears 11. The two coils indicated at 19 have their terminal portions 20 bent into engagement with the arms 15, and both coils are connected by the intermediate portion of the wire indicated at 21, this portion of the wire lying above the bracket 10 as shown and operating to hold the bar 13 in engagement within the notches 12, so that the bar cannot drop down at any time. These springs also operate to force the arms 15 resiliently toward the windshield so that the frame 17 will be in proper position with respect thereto.

From the foregoing description and a study of the drawings it will be apparent that we have thus provided a simply constructed and consequently inexpensive attachment to a windshield which will most efficiently operate to prevent frosting thereof so that the driver will at all times have a clear and unobstructed view ahead.

While we have shown and described the preferred embodiment of the invention it is of course to be understood that we reserve the right to make such changes in the form, construction and arrangement of parts as will not depart from the spirit of the invention or the scope of the subjoined claims.

We claim:

1. A windshield attachment comprising a supporting bracket adapted to be mounted above the windshield of an automobile, a bar detachably supported by said bracket, arms depending from said bar, and a rectangular glass covered frame carried by said arms and adapted to lie against the windshield, and spring means for urging said arms toward the windshield, and for holding the bar in position upon the bracket, consisting of a single length of wire having its intermediate portion engaging upon the top of the bracket, having its end portions coiled about the bar, with its terminals engaging said arms.

2. A device of the character described comprising a supporting bracket adapted to be mounted in the top of a car above the windshield and formed at its ends with forwardly extending ears having their lower edges formed with notches, a bar having notches engaging within said first named notches, arms depending from said bar, a glass covered frame pivotally carried by the lower ends of said arms and adapted to bear against the windshield, and a single spring having its intermediate portion extending along and lying upon the top of said bracket with its end portions coiled about said bar outwardly of said ears, the terminals of the spring engaging said arms.

In testimony whereof we affix our signatures.

WESLEY THURMAN.
STELLA SMITH.